United States Patent [19]

Cheatham et al.

[11] Patent Number: 5,629,815
[45] Date of Patent: May 13, 1997

[54] APPARATUS AND METHOD FOR REDUCING HEAD WEAR IN HELICAL SCAN TAPE TRANSPORT

[75] Inventors: Samuel D. Cheatham, Golden; William C. Dodt, Broomfield; John C. Owens, Arvada; Debra C. Rutherford, Longmont, all of Colo.

[73] Assignee: Storage Technology Corp., Louisville, Colo.

[21] Appl. No.: 408,920

[22] Filed: Mar. 22, 1995

Related U.S. Application Data

[63] Continuation-in-part of Ser. No. 155,569, Nov. 22, 1993, abandoned.

[51] Int. Cl.⁶ ............................................. G11B 5/027
[52] U.S. Cl. ..................................................... 360/84
[58] Field of Search .......................... 360/97.01–97.03, 360/137; 369/75.1, 292

[56] References Cited

U.S. PATENT DOCUMENTS

| | | | |
|---|---|---|---|
| 3,723,980 | 3/1973 | Gabor | 360/97 |
| 4,633,351 | 12/1986 | Bardos et al. | 360/103 |
| 4,642,715 | 2/1987 | Ende . | |
| 5,128,815 | 7/1992 | Leonhardt et al. | 360/85 |
| 5,301,178 | 4/1994 | Okabe et al. | 369/77.1 |

FOREIGN PATENT DOCUMENTS

| | | |
|---|---|---|
| 465153 | 1/1992 | European Pat. Off. . |
| 55-163671 | 12/1980 | Japan . |
| 1-52279 | 2/1989 | Japan . |
| 3-228279 | 10/1989 | Japan . |
| 1-260689 | 10/1989 | Japan . |
| 4-21990 | 1/1992 | Japan . |
| 4-19891 | 1/1992 | Japan . |
| 4-330694 | 11/1992 | Japan . |

OTHER PUBLICATIONS

IBM Technical Disclosure Bulletin, vol. 19, No. 10, Mar. 1977, p. 3846.
IBM Technical Disclosure Bulletin, vol. 28, No. 12, May 1986, p. 5403.

*Primary Examiner*—Stuart S. Levy
*Assistant Examiner*—Allen Cao
*Attorney, Agent, or Firm*—Sterne, Kessler, Goldstein & Fox P.L.L.C.

[57] ABSTRACT

An apparatus for reducing head wear in a helical scan tape transport passes a flow of relatively clean, dry air through a transport housing without allowing the flow of air to flow directly across the rotary head assembly. Air from a fan positioned at a rear portion of the transport cools a power supply and creates a positive air pressure within the transport housing. The air is heated by the power supply before it passes through the transport housing, so that only relatively "dry" air reaches the rotary head assembly. The air is exhausted out the opening through which a tape is loaded. This arrangement substantially reduces the possibility of contaminants entering the transport housing. Additionally, the air cleans a magnetic recording tape on a tape cartridge as the tape is passes through the transport housing so that only relatively "clean" tape reaches the rotary head assembly.

3 Claims, 5 Drawing Sheets

APPARATUS AND METHOD FOR REDUCING HEAD WEAR IN HELICAL SCAN TAPE TRANSPORT

BACKGROUND OF THE INVENTION

1. Related Applications

This application is a continuation-in-part of U.S. utility patent application Ser. No. 08/155,569, filed Nov. 22, 1993, now abandoned.

2. Field of the Invention

The invention relates generally to the storage of data on magnetic recording tape, and more specifically, to the storage of digital data in helical format on a magnetic tape housed within a single reel tape cartridge.

3. Related Art

The data processing industry stores large quantities of digital data on magnetic tapes. The 3480 tape cartridge (developed by IBM Corporation, Armonk, N.Y.) is an industry standard for magnetic storage media. The 3480 cartridge is a single-reel cartridge which houses a length of one-half inch wide magnetic tape.

Read/write operations are performed by a tape "transport." The standard tape transport accepts a tape cartridge into an elevator assembly. A threading mechanism grabs the leader block and pulls it free from the cartridge. A pivoting motion of the threading mechanism then sweeps the leader block through an arc. As the leader block travels through the arc, the tape is threaded across a longitudinal read/write head and into a slot in a take-up reel. Once threaded, the tape from the cartridge can be driven across the read/write heads for data transfer operations.

The standard 3480 cartridge contains 541 feet of one mil thick tape. Data is typically stored on the tape in an 18 track longitudinal format, providing approximately 200 MB (megabytes) of data storage capacity.

Commonly owned U.S. patent application Ser. No. 08/060,653, filed May 13, 1993, and titled "Helical Scan Transport for Single Reel Tape Cartridge," discloses a tape transport which stores data in a helical format. As compared to longitudinal recording, the helical format increases the storage capacity of a data cartridge by a factor of greater than 100 by simply changing the data storage format.

In the helical transport, a threading mechanism grabs the leader block of a tape and pulls it free from the cartridge. A linear threading mechanism is then used to thread the tape through a plurality of guide posts along a substantially linear thread path. Once threaded, an inclined post assembly wraps the tape around a rotary head (helical scanner) for read/write operations.

In either the longitudinal or the helical transport, a tape cartridge must be entered into a load mechanism (elevator assembly) of the tape drive. This creates the potential for contaminants (e.g., dust and other foreign particulates) entering around the load mechanism. Contaminants which reach the tape path can cause data errors. It is desirable to prevent contaminants from entering a transport during tape loading.

Additionally, head wear is a problem particular to a rotary head in a helical scan drive. The magnetic tape from the tape cartridge is passed around the helical head, and the head performs read/write operations on the tape while rotating at approximately 6,000 rpm. The presence of contaminants or moisture between the rotary head and the tape at these speeds causes the head to wear. Thus, it is also desirable to prevent contaminants and moisture from reaching the rotary head.

SUMMARY OF THE INVENTION

The invention is an apparatus and method for reducing head wear in a helical scan tape transport. A fan is positioned at a rear portion of the transport. The flow of air provided by the fan travels through the transport housing and reduces head wear by: (1) cleaning the tape as it passes through the tape transport so that relatively "clean" tape reaches the helical head; (2) creating a positive air pressure so that contaminants that enter through with the tape cartridge when it is inserted are pushed back out the elevator opening, (3) heating the air so that relative "dry" air reaches the area surrounding the helical head assembly; and (4) preventing air from flowing directly across the helical head assembly. Thus, once the tape reaches the rotary head, substantially all contaminants on the tape have been removed.

The transport apparatus is configured so that the flow of air does not directly flow across the rotary head because pressure from the flow of air at this point may cause the tape to flutter, thereby causing data errors to occur during the read/write operations.

The fan creates a positive air pressure within the transport housing. The air is exhausted out the opening in the housing through which a tape is loaded. This arrangement substantially reduces the possibility of contaminants entering the transport housing.

The transport of the invention includes a chassis defining a transport region at a front end and a circuit card region at a rear end. The transport region is separated from the circuit card region by a wall. The transport region houses an elevator assembly, a helical deck, a take-up reel, and a linear threading mechanism. The elevator assembly is configured to receive a tape cartridge when the cartridge is loaded into the transport.

The circuit card region houses a mother board and a power supply. The mother board includes a plurality of electrical edge-connectors to allow the vertical mounting of a plurality of circuit cards in the circuit card region. A cover seals the circuit card region from the transport region.

A housing, coupled to the chassis, encloses the transport. The housing includes an upper dust cover and two lower belly pans. A front opening in the housing at the position of the elevator assembly allows a tape cartridge to be loaded through the housing and into the elevator assembly. Two openings are provided in the wall which surrounds the circuit card region at the rear portion of the transport. A fan is coupled to each opening.

A first fan flows air through the circuit card region to cool circuit cards mounted on the mother board. This air then passes beneath the chassis and is exhausted out the sides of the transport through openings between the chassis and one of the belly pans.

A second fan flows air through the power supply in the circuit card region, through a filter, through an opening in the wall surrounding the circuit card region, through the transport region, and out through the opening in the housing at the elevator assembly. This air flow from the second fan produces a positive air pressure in the housing to substantially prevent contaminants from entering the transport region when a tape cartridge is loaded into the transport.

Passing the air from the second fan through the power supply prior to entering the transport region serves two purposes. First, the power supply is cooled. Second, the air is warmed as it picks up heat from the power supply. Warming the air increases its moisture holding capacity to assure that only relatively "dry" air enters the transport region. Moisture increases head wear of the rotary head. Thus, the "dry" air passing into the transport region reduces head wear and results in a significant increase in head life.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

The preferred embodiment of the invention is discussed with reference to the figures in which like reference numbers indicate like elements. Furthermore, the left most digit of each reference number indicates the number of the figure in which the number first appears. While specific part numbers and configurations are discussed, it should be understood that this is done for illustration purposes only. A person skilled in the art will recognize that other components and configurations may be used without departing from the spirit and scope of the invention.

Figure 1:
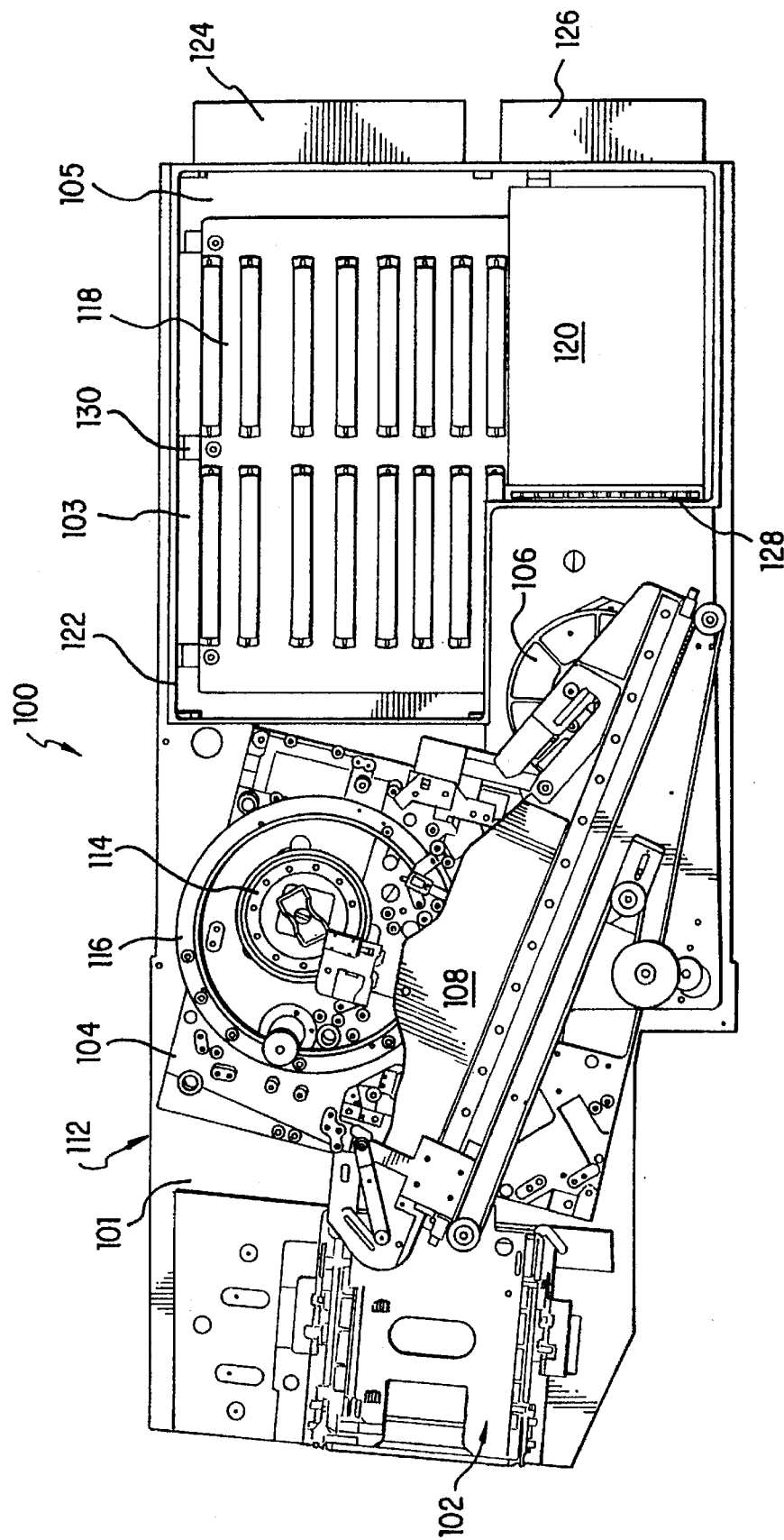
FIG. 1 is a top view of the helical transport of the invention with the housing removed.

The tape transport 100 of the invention is shown in FIG. 1. Transport 100 includes a chassis 112 having a transport region 101 and a circuit card region 103. Circuit card region 103 is surrounded by a wall 122 which separates circuit card region 103 from transport region 101. Wall 122 also forms the outer, rear wall of the transport housing (discussed below).

Transport region 101 houses an elevator assembly 102, a helical deck 104, a take-up reel 106, and a linear threading mechanism 108. Elevator assembly 102 is configured to receive a tape cartridge when the cartridge is loaded into transport 100. Helical deck 104 includes a rotary scanning head 114, a loading ring 116, and a capstan and plurality of guideposts which make up a tape path between elevator assembly 102 and take-up reel 106.

Circuit card region 103 houses a mother board 118 and a power supply 120. Chassis 112 is cut-away at circuit card region 103. Mother board 118 and power supply 120 are mounted on supports 130 which extend inward from the peripheral edge of chassis 112. Mother board 118 includes a plurality of electrical edge-connectors to allow the vertical mounting of a plurality of circuit cards in circuit card region 103. Power supply 120 is a DC to DC converter which provides power to the electronic circuitry of transport 100.

Tape transport 100 is described in further detail in U.S. patent application Ser. No. 08/060,653, filed May 13, 1993, entitled "Helical Scan Transport For Single Reel Tape Cartridge." The '653 application is incorporated herein by reference.

Figure 4:
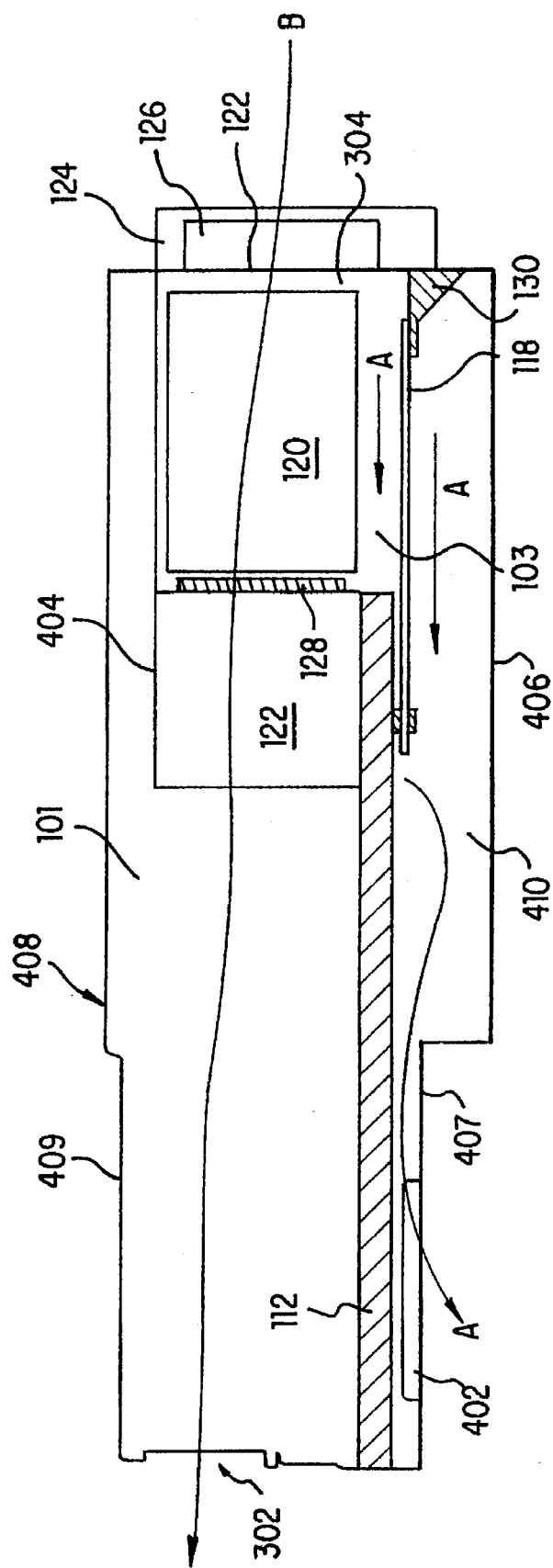
FIG. 4 is a simplified cross-sectional view taken along line I—I of FIG. 3.
Figure 5:
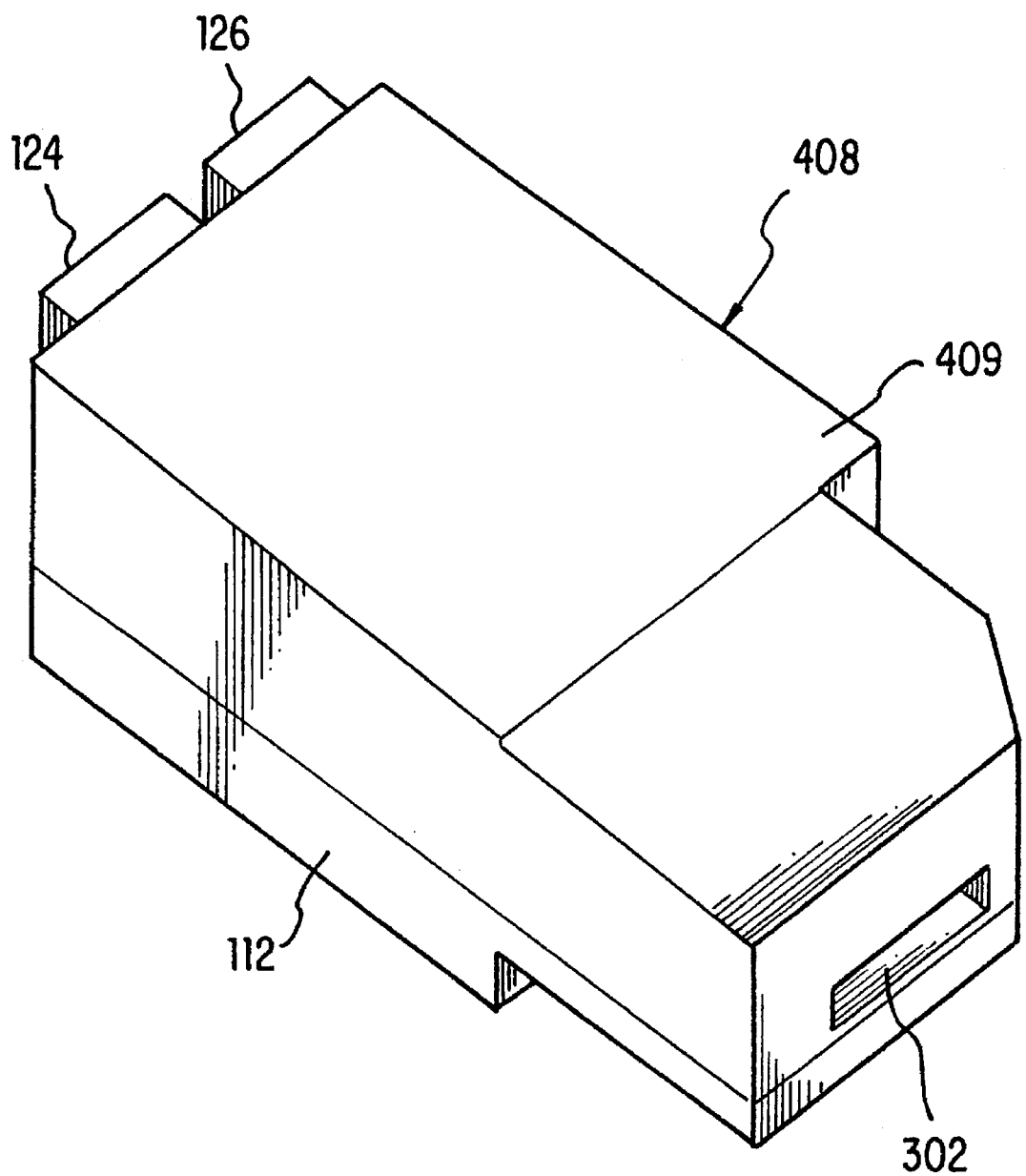
FIG. 5 is a perspective view of the helical transport of the invention.

Referring now to FIGS. 4 and 5, a housing 408 is shown enclosing transport 100. Housing 408 is formed from a dust cover 409, a rear belly pan 406, a front belly pan 407, and a rear portion of wall 122 of chassis 112. Dust cover 409 mates with chassis 112 and wall 122 to substantially seal an upper portion of transport 100 to prevent dust and other contaminants from entering transport region 101. As discussed in further detail below, belly pans 406,407 couple with chassis 112 to seal a region 410 below chassis 112. An opening 302 is disposed at the front end of dust cover 409. Opening 302 is positioned to correspond to elevator assembly 102 and to allow passage of a tape cartridge through housing 408 and into elevator assembly 102. An exhaust open 402 is formed at each side of transport 100 between chassis 112 and front belly pan 407.

As discussed above, a tape cartridge inserted into elevator assembly 102 potentially introduces contaminants or debris into transport 100. Such contaminants may reach head 114 and cause data errors. It is desirable to substantially reduce or eliminate the introduction of debris in conjunction with the loading of a cartridge into elevator assembly 102.

The invention substantially reduces or eliminates the entry of debris into transport 100 by providing a positive air pressure in transport region 101 of transport 100. To accomplish this, air is drawn into the housing at the rear of chassis 112 and is exhausted out opening 302. This positive air pressure substantially eliminates the possibility of debris entering transport 100 and interfering with data transfer operations at helical head 114. The invention also substantially removes contaminants on the tape before they reach helical head 114. To accomplish this, air drawn into the housing is directed so that it flows along the tape as it travels along the tape path between elevator assembly 102 and take-up reel 106. The air cleans the tape before the tape is threaded across helical head 114. Thus only relatively "clean" tape reaches the helical head. The reduction or elimination of contaminants on helical head 114 prevents data errors from occurring and extends head life of the helical head.

Figure 2:
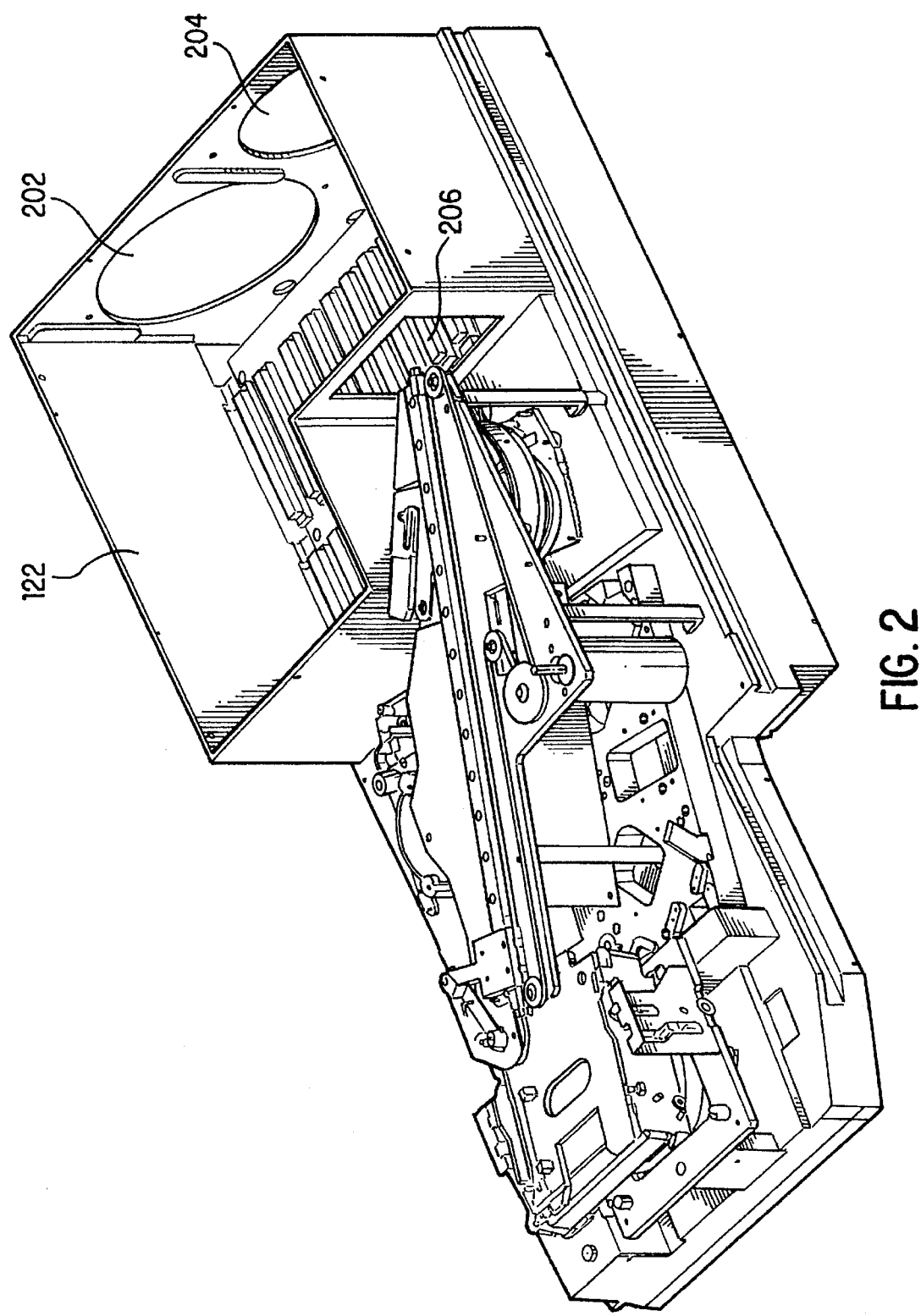
FIG. 2 is a perspective view of the helical transport of the invention with the housing removed.

FIG. 2 is a perspective view of transport 100 with dust cover 409 and circuit card region cover 404 (discussed below) removed. Wall portion 122 includes an air intake 202, an air intake 204, and a filter opening 206. As shown in FIG. 1, a fan 124 is mounted at air inlet 202, and a fan 126 is mounted at air inlet 204. A filter 128 is mounted at filter opening 206 between wall 122 and power supply 120.

Fan 124 is configured to draw air into and flow air across the circuit cards (not shown) mounted on mother board 118 in a vertical configuration, parallel to the air flow. As discussed in greater detail below, the air from fan 124 flows both above and beneath mother board 118 and beneath chassis 112 in region 410 before being exhausted through openings 402 (discussed below with reference to FIGS. 3 and 4).

Fan 126 pushes air through power supply 120, through filter 128, through filter opening 206, and into transport region 101. The air from fan 126 is then exhausted through opening 302 in housing 408. Both of fans 124,126 are standard muffin-type fans commonly used to cool electronic equipment. Filter 128 is a polypropylene filter which will filter particulates of 0.3 microns ($0.3 \times 10^{-6}$ meter) and larger.

The air flow of fan 124 is substantially isolated from the air flow of fan 126. The two air flow paths are now described with reference to FIGS. 3 and 4. The air flow from fan 124 is illustrated by arrows A in FIG. 3. Note that airflow A is limited to circuit card area 103 by wall 122. Airflow A is not permitted to enter the region of helical transport 104. Wall 122 forces air flow A down through the cut-away portion of chassis 112 at circuit card region 103. Airflow A then travels beneath chassis 112 through region 410 and is exhausted out openings 402 formed at the sides of transport 100 between chassis 112 and front belly pan 407.

FIG. 4 illustrates housing 408 (including dust cover 409, wall 122 and belly pans 406,407) and a circuit card region cover 404. Circuit card region cover 404 substantially seals the top of circuit card region 103 at an upper portion of wall 122 to isolate airflow A of fan 124 from transport region 101. Belly pans 406,407 seal the region 410 below chassis 112 and contain airflow A from fan 124 as it passes across mother board 118 and is exhausted out openings 402. In the preferred embodiment, a circuit card (not shown) is attached to the underside of chassis 112 beneath belly pan 407. Air flow A removes heat from this circuit card before being exhausted out openings 402.

Figure 3:
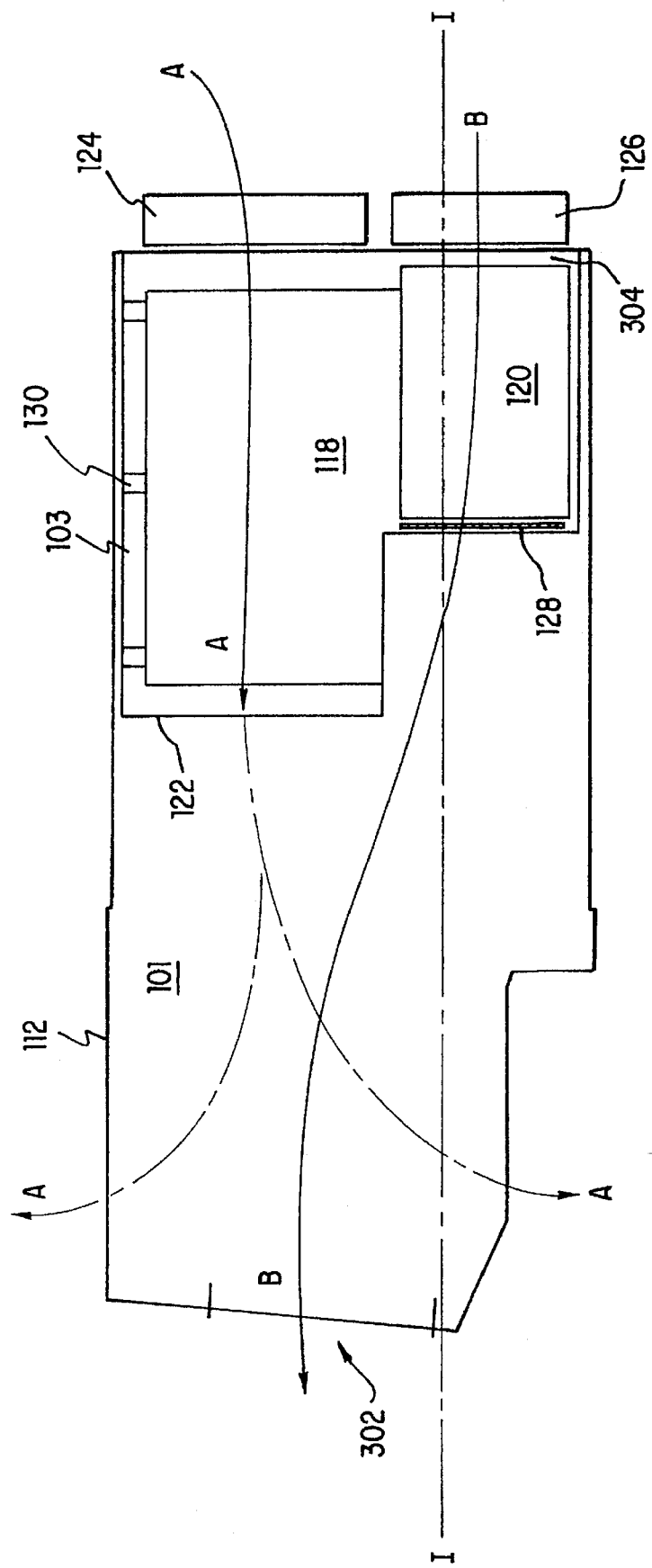
FIG. 3 is a simplified top view of the helical transport of the invention.

Referring to FIGS. 3 and 4, an airflow B of fan 126 is described. Air flow B travels through power supply 120. Upon exiting power supply 120, the air flows through filter 128, through opening 206 in wall 122, and into transport region 101. The air then exits through opening 302 in housing 408. Passing airflow B through power supply 120 prior to entering transport region 101 serves two purposes. First, power supply 120 is cooled. Second, the air is warmed as it picks up heat from the power supply. Warming the air increases its moisture holding capacity to assure that only relatively "dry" air enters transport region 101. Note that power supply 120 is positioned so that a space 304 is present between the power supply and fan 126. Space 304 allows a turbulent air flow to develop for improved heat transfer between power supply 120 and airflow B.

Thus, airflow B of fan 126 performs four functions. First, airflow B removes heat from power supply 120. Second, airflow B provides a positive pressure within housing 408 to reduce the potential for contaminants entering through opening 302. Third, airflow B cleans the tape as it is being threaded so that only "clean" tape reaches helical head 114 so that the life of the head is extended. Fourth, airflow B provides a flow of relatively "dry" air to transport regions 101 to prevent moisture from accumulating between the tape and helical head 114 so as to extend head life. For example, the helical head assembly in the preferred embodiment and currently used in the Panasonic D350 has a head life of approximately 1,000–1,500 hours. The present invention has been shown to extend head life of a rotary head to at least 2,000 hours. This is 500 to 1,000 hours more head life than a conventional helical scan tape apparatus. Note that fan 126 and opening 302 are positioned so that airflow B does not flow directly across helical head 114. This reduces the possibility that airflow B will interfere with the dynamics of a tape as it travels across head 114.

The invention has been described in the preferred embodiment in which two fans are used for cooling. A person skilled in the art will recognize that other configurations may be used. For example, a single fan may be used to implement the invention, provided that the fan can provide sufficient cooling for any transport components requiring cooling. In an embodiment using a single fan, at least a portion of the air flow must pass through transport portion 101 and exit through opening 302 to provide the positive air flow of the invention which reduces the introduction of contaminants into the transport.

While the invention has been particularly shown and described with reference to several preferred embodiments thereof, it will be understood by those skilled in the art that various changes in form and details may be made therein without departing from the spirit and scope of the invention as defined in the appended claims.

We claim:

1. A transport apparatus for reducing head wear of a rotary head assembly, the transport apparatus comprising:

a housing having a transport region and a circuit card region;

an intake opening disposed on a rearward portion of said transport region and a loading opening disposed on a forward portion of said transport region;

an elevator assembly disposed within said transport region between said intake opening and said loading opening, wherein a tape cartridge is inserted through said loading opening and onto said elevator assembly;

a take-up reel disposed within said rearward portion of said transport region;

a rotary head disposed within said transport region between said elevator assembly and said take-up reel for performing read/write operations on a magnetic recording tape;

a threading mechanism disposed within said transport region for threading said magnetic recording tape through a tape path, wherein said tape path advances from the tape cartridge, across said rotary head and onto said take-up reel;

air flow means for passing a flow of air through said housing along a predetermined air flow path, wherein said flow of air passes:

a) through said circuit card region;

b) through said intake opening to enter said transport region;

c) past, without flowing directly on said rotary head;

d) along the magnetic recording tape as it is being threaded through said tape path so that contaminants on said magnetic recording tape are removed before the tape is threaded across said rotary head; and e) through said loading opening to exit said housing, so that contaminants are prevented from entering said housing while the tape cartridge is being exchanged.

2. The transport apparatus of claim 1, wherein said flow of air is heated as it passes through said circuit card region so that relatively "dry" air is passes through the transport region so that head life of said rotary head is extended.

3. The transport apparatus of claim 2, further comprising:

a filter disposed within said circuit card region, wherein said flow of air passes through said filter before entering said transport region to further reduce the possibility of contaminants entering said transport region.

* * * * *